(12) United States Patent
Dai et al.

(10) Patent No.: US 10,782,988 B2
(45) Date of Patent: Sep. 22, 2020

(54) OPERATING SYSTEM FOR DISTRIBUTED ENTERPRISE ARTIFICIAL INTELLIGENCE PROGRAMS ON DATA CENTERS AND THE CLOUDS

(71) Applicant: Petuum Inc., Pittsburgh, PA (US)

(72) Inventors: Wei Dai, Pittsburgh, PA (US); Weiren Yu, Beijing (CN); Eric P Xing, Pittsburgh, PA (US); Aurick Qiao, Pittsburgh, PA (US); Qirong Ho, Pittsburgh, PA (US)

(73) Assignee: Petuum Inc., Pittsburgh, PA (US)

( * ) Notice: Subject to any disclaimer, the term of this patent is extended or adjusted under 35 U.S.C. 154(b) by 0 days.

(21) Appl. No.: 15/796,626

(22) Filed: Oct. 27, 2017

(65) Prior Publication Data

US 2018/0307509 A1 Oct. 25, 2018

Related U.S. Application Data

(60) Provisional application No. 62/489,977, filed on Apr. 25, 2017.

(51) Int. Cl.
| | |
|---|---|
| *G06F 9/455* | (2018.01) |
| *G06F 9/50* | (2006.01) |
| *G06F 9/54* | (2006.01) |
| *G06F 16/951* | (2019.01) |
| *G06F 9/445* | (2018.01) |

(Continued)

(52) U.S. Cl.
CPC ......... *G06F 9/45533* (2013.01); *G06F 9/445* (2013.01); *G06F 9/45558* (2013.01); *G06F 9/5011* (2013.01); *G06F 9/5027* (2013.01); *G06F 9/547* (2013.01); *G06F 16/951* (2019.01); *G06F 2009/4557* (2013.01); *G06F 2009/45591* (2013.01); *G06N 20/00* (2019.01); *H04L 63/08* (2013.01)

(58) Field of Classification Search
CPC .... G06F 9/45533; G06F 9/5011; G06F 9/547; G06F 16/951; G06N 20/00; H04L 63/08
USPC .......................................................... 718/1
See application file for complete search history.

(56) References Cited

U.S. PATENT DOCUMENTS 9,524,183 B1 * 12/2016 Phelan ................ G06F 9/45558
9,569,198 B2 * 2/2017 Spivak ................... G06F 9/5055

(Continued)

OTHER PUBLICATIONS

Carter, Jerome, "Coupling and Cohesion: A View of Software Design from the Inside Out," EHR Science, Nov. 12, 2012, last retrieved from https://www.ehrscience.com/2012/11/12/coupling-and-cohesion-a-view-of-software-design-from-the-inside-out-2/ on Jan. 26, 2020 (Year: 2012).*

(Continued)

*Primary Examiner* — Andrew M. Lyons

(57) ABSTRACT

A system including a master machine and a plurality of worker machines is disclosed. The master machine includes, for example, an API server configured to receive a job description; a resource allocation module configured to determine a number of virtual machines required to perform a job based on the job description; a container scheduling module configured to create a container containing the number of virtual machines required to perform the job, wherein at least two of the virtual machines in the container resides on different worker machines, and wherein each of the virtual machines is configured to run a same application to perform the job.

16 Claims, 6 Drawing Sheets

(51) Int. Cl.
H04L 29/06 (2006.01)
G06N 20/00 (2019.01)

(56) References Cited

U.S. PATENT DOCUMENTS

| | | | | |
|---|---|---|---|---|
| 9,575,808 | B1* | 2/2017 | Yamala | G06F 9/45558 |
| 10,037,424 | B1* | 7/2018 | Guenther | G06F 9/45558 |
| 2014/0026133 | A1* | 1/2014 | Parker | G06F 9/5083 |
| | | | | 718/1 |
| 2014/0109087 | A1* | 4/2014 | Jujare | G06F 9/45558 |
| | | | | 718/1 |
| 2014/0245298 | A1* | 8/2014 | Zhou | G06F 9/455 |
| | | | | 718/1 |
| 2015/0120928 | A1* | 4/2015 | Gummaraju | H04L 67/1008 |
| | | | | 709/226 |
| 2015/0121371 | A1* | 4/2015 | Gummaraju | G06F 9/45558 |
| | | | | 718/1 |
| 2015/0160884 | A1* | 6/2015 | Scales | G06F 3/067 |
| | | | | 711/114 |
| 2015/0256481 | A1* | 9/2015 | Turovsky | H04L 67/10 |
| | | | | 709/226 |
| 2015/0379424 | A1* | 12/2015 | Dirac | G06N 20/00 |
| | | | | 706/12 |
| 2016/0078361 | A1* | 3/2016 | Brueckner | H04L 67/10 |
| | | | | 706/12 |
| 2016/0371108 | A1* | 12/2016 | Madtha | H04L 67/10 |
| 2016/0378519 | A1* | 12/2016 | Gaurav | G06F 9/5077 |
| | | | | 718/1 |
| 2016/0378554 | A1* | 12/2016 | Gummaraju | G06F 9/5011 |
| | | | | 718/104 |
| 2018/0025160 | A1* | 1/2018 | Hwang | G06F 21/577 |
| | | | | 726/25 |
| 2018/0046807 | A1* | 2/2018 | Patil | H04L 43/0817 |
| 2018/0300653 | A1* | 10/2018 | Srinivasan | H04L 67/06 |

OTHER PUBLICATIONS

W. Gerlach et al., "Skyport—Container-Based Execution Environment Management for Multi-cloud Scientific Workflows," 2014 5th International Workshop on Data-Intensive Computing in the Clouds, New Orleans, LA, 2014, pp. 25-32, doi: 10.1109/DataCloud.2014.6. (Year: 2014).*

S. Radhakrishnan, B. J. Muscedere and K. Daudjee, "V-Hadoop: Virtualized Hadoop using containers," 2016 IEEE 15th International Symposium on Network Computing and Applications (NCA), Cambridge, MA, 2016, pp. 237-241, doi: 10.1109/NCA.2016.7778624. (Year: 2016).*

* cited by examiner

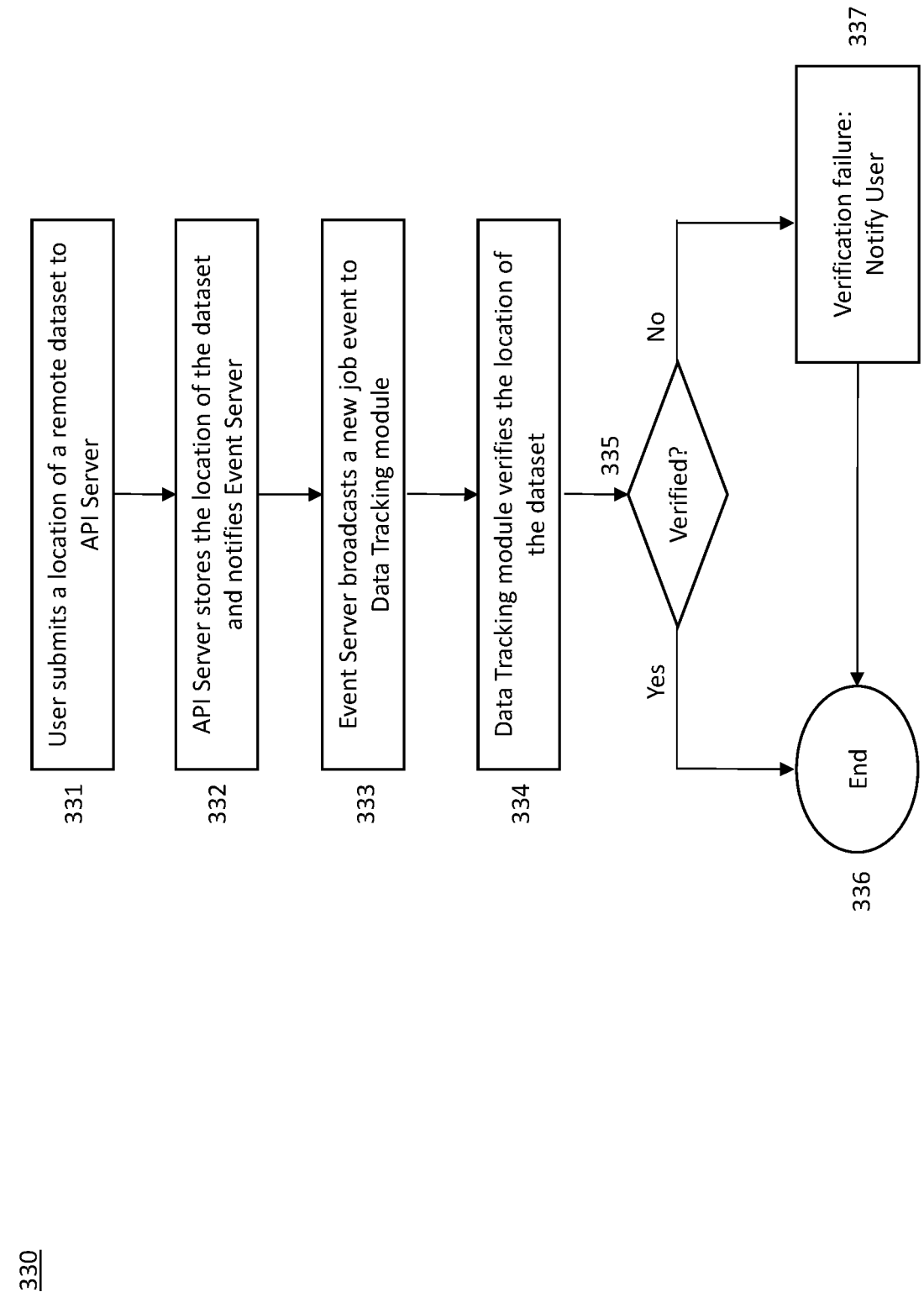

OPERATING SYSTEM FOR DISTRIBUTED ENTERPRISE ARTIFICIAL INTELLIGENCE PROGRAMS ON DATA CENTERS AND THE CLOUDS

FIELD OF THE INVENTION

The present invention generally relates to an operating system for enterprise Artificial Intelligence (AI) programs, and more particularly, is directed to a method of virtualizing computing resources, such as data centers and Internet of Things (IOT), for a rapid creation and deployment of standardized and scalable enterprise-grade AI and Machine Learning (ML) solutions that are correct, repeatable, secure and resource-efficient.

BACKGROUND

Artificial Intelligence (AI) and Machine Learning (ML) applications have become increasingly popular in clouds and data centers, especially in an enterprise environment. Typically, most modern enterprise AI data centers are highly multi-tenant environments where various asset parameters, such as the currently running jobs, available resources, runnable models and algorithms, datasets, are constantly changing. However, despite that fact existing AI software leverages the specific properties of AI programs to achieve high performance, such software does not provide such elements as hardware, data, model, job, algorithm or user management functionalities for enterprise data centers. Nor do they provide installation and deployment support. While certain software may provide jobs, resources (e.g., CPU, Memory, GPU, Storage, etc.) and management functionalities, they do not provide direct support for AI applications.

Therefore, there is a need for an Operating System (OS) software in the enterprise AI data centers that can manage all these assets as mentioned above, and further, can provide amplification for arbitrary AI applications.

The management functionalities provided by the inventive system are beneficial for data scientists, the data center, and the enterprise as a whole. The data scientists can stop worrying about any hardware resource management problem or job-job resource contention problem in a multi-tenant environment. The data scientists will also be able to enhance their programs with distributed and parallel processing, and manage their jobs, models and algorithms, and datasets. The data center can run more efficiently with the job and resource scheduling functionalities. The enterprise will be alleviated the common maintenance problems, such as software installation and deployment with the inventive auto deployment functionality, and reduce total ownership cost.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a system, which comprises a master machine and a plurality of worker machines, the master machine comprising: an API server configured to receive a job description; a resource allocation module configured to determine a number of virtual machines required to perform a job based on the job description; a container scheduling module configured to create a container containing the number of virtual machines required to perform the job, wherein at least two of the virtual machines in the container resides on different worker machines, and wherein each of the virtual machines is configured to run a same application to perform the job.

Another embodiment is directed to a method of running an application comprising: receiving a job description from a client; storing the job description in a database; determining a number of virtual machines needed to perform a job based on the job description; creating a distributed container containing the number of virtual machines across a plurality of physical machines; and enabling instances of an application on each of the virtual machines to perform the job.

Also, one additional embodiment is directed to a non-transitory computer-readable medium comprising instructions which, when executed by a processor, initiate a process comprising: receiving a job description from a client; storing the job description in a database; determining a number of virtual machines needed to perform a job based on the job description; creating a distributed container containing the number of virtual machines across a plurality of physical machines; and enabling instances of an application on each of the virtual machines to perform the job.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 3a-c are flow charts illustrating exemplary processes of handling data requests in the OS of FIGS. 1 and 2 according to embodiments of the disclosure.

DETAILED DESCRIPTION OF EXEMPLARY EMBODIMENTS

Figure 1:
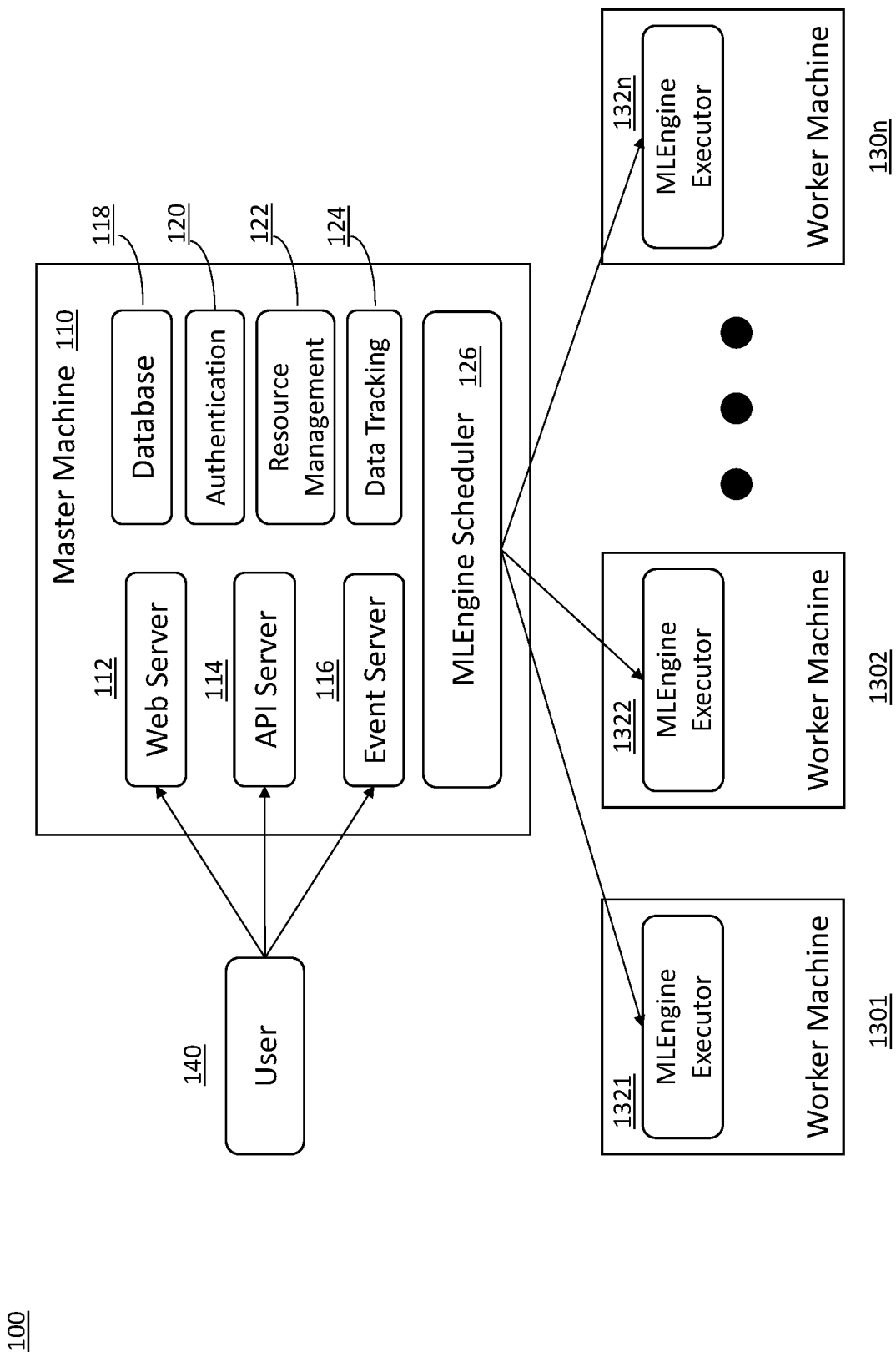
FIG. 1 is a block diagram illustrating an exemplary system diagram of a distributed computing system 100, according to an embodiment of the disclosure.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments of the present disclosure allow computer programs such as an artificial intelligence program which are traditionally written for running on a single laptop or computer desktop to run simultaneously on many virtual machines without having to modify the program. These many machines can reside in a data center or on a cloud. Together, they can form a distributed computing system that is capable to run a single AI or ML program on multiple machines simultaneously to achieve improved performance of the program. In one embodiment, an OS can be provided to receive a job through a user interface, allocate resources required to perform the job from a distributed system that includes multiple virtual and/or physical worker machines, divide up the task among the available machines, and finally, receive and aggregate the results from these machines to generate an output. The programs and data required to perform a task can be uploaded to the OS and distributed to one or more worker machines in the distributed system. Essentially, the OS can take a program and divide the work by running multiple instances of the program within an isolated environment (i.e., a distributed container) on different machines and then combine the results received from these machines. It should be understood that the exemplary systems and methods disclosed hereinafter can be used for running any program. In particular, these systems and methods can improve the performance of AI and ML programs significantly due to the complexity of these programs and the amount of computing involved when running these programs.

FIG. 1 illustrates an exemplary system diagram of a distributed computing system 100 according to an embodiment of the disclosure. The system 100 includes a Master Machine 110 in communication with multiple Worker Machines 1301, 1302, . . . , 130n. The Master Machine 110 can include a Web Server module 112, API Server 114, Event Server module 116, Database module 118, Authentication module 120, Resource Management module 122, Data Tracking module 124, and Machine Learning Execution Engine (MLEngine) Scheduler 126. In one embodiment, the distributed computing system 100 can be implemented as an OS.

The Authentication module 120 provides methods of ownership for resources: datasets, jobs, machines, etc. It is capable of having owners that have control over and visibility of these resources. It can also provide various methods of authentication: users will need to create accounts, and be able to log into those accounts to access resources and run programs such as the AI and ML programs mentioned above. It should be understood that any suitable login methods can be provided by the Authentication module 120.

The Web Server module 112 may receive a request from a user (or a client) 140 to perform a task. The Web Server module 112 can process the web-based request and forward it to the API server 114. Alternatively, a user request may be submitted via a command line interface directly to the API server 114. It should be understood that user requests can be submitted via any other well-known interfaces to the API server module 114 of the Master Machine 110. The request can be a request to upload data to the OS, a request to upload a machine learning program or any other program suitable for running in the OS, or a request to run a program such as a machine learning program on a set of data. The processing of each of these types of requests will be discussed in detail in view of FIGS. 3a-c.

The Database module 118 can be responsible for persistent storage of meta data information. It can also include an in-memory caching database for data access speedup. In some embodiments, the API Server module 114 can store the user requests (or job descriptions) in the database module 118. Alternatively or additionally, the database module 118 can also store a library of programs (e.g., AI or ML programs) that can ran on one or more of the Worker Machines 1301, 1302, . . . 130n connected to the Master Machine 110. Alternatively or additionally, the database module 118 can also store data required to run these programs in response to a user request. In one embodiment, the Database module 118 can be a distributed database residing on one or more cloud servers and data stored in the Database module 118 can be partitioned across the different servers.

The Data Tracking module 124 aims to support any kind of data source, and closely couple data with its meta data and decouple the applications from the actual data source. In simple terms, when the data is present as a file/data/stream at some external location in some format, this module is able to get that data to be accessible and consumable to the applications running in the system 100.

In addition to storing the user request in the database module 118, the API server module 114 can generate a job description based on the user request and notify the Event Server 116 about the job description. In response, the Event Server 116 can broadcast the job event to the MLEngine Scheduler 126. The MLEngine Scheduler 126 can verify that the job description satisfies certain criteria (i.e., the job is one that can be performed by the system). If the verification fails, the client can be notified. If the job description is verified, the MLEngine Scheduler can schedule one or more MLEngine Executors 1331, 1332, . . . , 133n on their respective worker machines 1321, 1322, . . . , 132n to take on the job. The MLEngine Executors can be multiple instances of the same computer program (e.g., a ML program) that are designed to run simultaneously on the multiple worker machines 1321, 1322, . . . , 132n.

At any point in time, there could be multiple programs running on the distributed system 100. Some of the Worker Machines 1301, 1302, . . . , 130n may already be running one of these programs. The Resource Management (RM) module 122 of the Master Machine 110 can allocate the necessary resources when a job is verified by the MLEngine Scheduler 126. In particular, the Resource Management module 122 can poll the status of the worker machines 1301, 1302, . . . , 130n and determine which of them still have sufficient resources (e.g., computing power, local storage, bandwidth) to handle the new job. The Resource Management Module 122 can also determine based on the job description the number of Worker Machines 1301, 1302, ..., 130n needed to perform the particular job. When one or more Worker Machines 1301, 1302, ..., 130n completes its task, the Resource Management module 122 can be notified and it can determine whether to assign a new job to the now-available Worker Machine.

In one embodiment, the Worker Machines 1301, 1302, ..., 130n can be virtual machines running on one or more physical servers or a cloud. When one or more Worker Machines 1301, 1302, ..., 130n are selected to take on a job (e.g., run an ML program on a set of data), a distributed container can be created across the one or more Worker Machines 1301, 1302, ..., 130n. Essentially, each of the distributed containers can provide an environment that is a completely clean machine or cluster of machines that has no other programs running in it. Only one program (e.g., an AI or ML program) can run in each container at one time. That is, the distributed container isolates the AI or ML program from the rest of the operations and programs that are going on in the distributed system 100.

Depending on how many Worker Machines 1301, 1302, ..., 130n are allocated by the Resource Management module 122 for a particular job, the MLEngine Scheduler 126 can coordinate with the various Worker Machines 1301, 1302, ... 130n and launch the containers on these Worker Machines 1301, 1302, ..., 130n to perform the job. After the assigned Worker Machines, specifically, the containers on these Worker Machines, complete the running of the program, the results can be collected by the Master Machine 110 and aggregated to produce an outcome.

Figure 2:
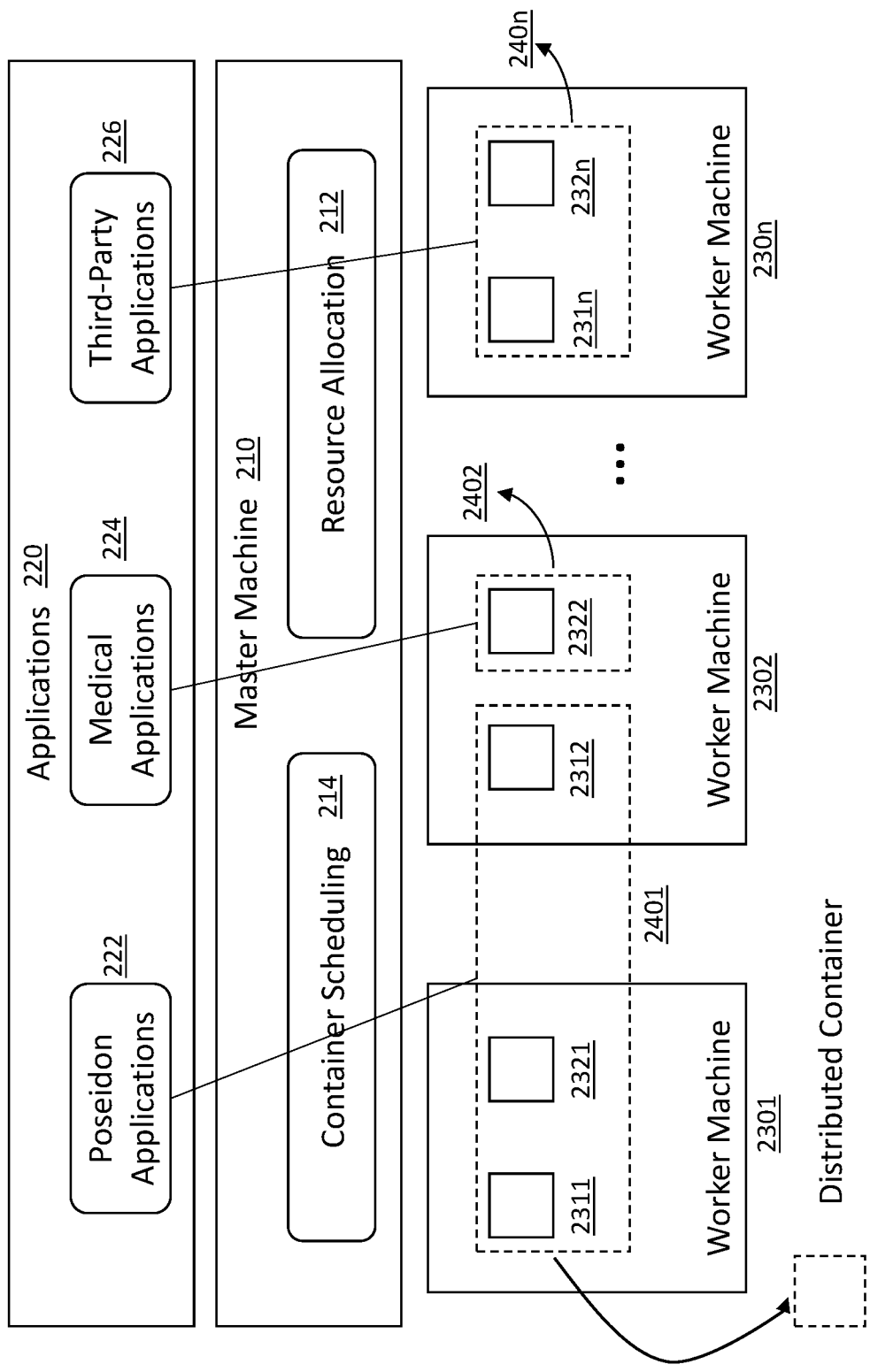
FIG. 2 is a block diagram providing an in-depth illustration of some of the modules of the distributed computer system of FIG. 1, according to another embodiment of the disclosure.

FIG. 2 illustrates multiple distributed containers 2401, 2402, ..., 240n each running one or more instances 2311, 2321, 2312, 2322, ..., 231n, 232n of a respective application program 222, 224, 226 in the distributed system 200. The distributed computing system 200 is similar to the system 100 of FIG. 1. It includes a Master Machine 210, an Application Cluster 220, and a number of Worker Machines 2301, 2302, ..., 230n. The Master Machine 210 of FIG. 2 includes a Container Scheduling Module 214 and a Resource Allocation module 212. The Application Cluster 220 can include one or more Application Programs such as the Poseidon Applications 222, Medical Applications 224, and any $3^{rd}$ party applications 226. These application programs can be designed for running on a distributed system such as the one disclosed in the embodiments of the present disclosure. The Application Cluster 220 can reside on a server Separate from the Master Machine 220, or on the same physical machine. The applications in the Application Cluster 220 can be uploaded from a client (not shown).

The Resource Allocation module 212 is similar to the Resource Management module 122 of FIG. 1 in that it can allocate a number of Worker Machines 2301, 2302, ..., 230n for a particular job based on resource availability. It can also dynamically give or take computing resources to and from jobs in the distributed system 200. Additionally or alternatively, it can also facilitate arbitrary node communication within a job, and impose resource limits on the entire distributed job.

The Container Scheduling module 214 can create one or more distributed containers on the allocated Worker Machine. Each newly-created distributed container is essentially an isolated computing environment on which a distributed program can run without any interruption by other programs. A distributed container can contain one or more virtual machines 2311, 2321, 2312 each capable of carrying out a job such as running a ML program. The virtual machines 2311, 2321, 2312 in the same container can be distributed over different Worker Machines 2301, 2301. Alternatively, all virtual machines 231n, 232n within the same distributed container 240n can reside on the same Worker Machine 230n. As shown in FIG. 2, a distributed container 2401 can be created by the Container Scheduling module 214 to run the Poseidon Application programs 222. The distributed container 2401 can include multiple virtual machines 2311, 2321 on Worker Machine 2301 and an additional virtual machine 2312 on Worker Machine 2302. The virtual machines 2311, 2321, 2312 can simultaneously run different instances of the Poseidon Applications 222 and return the results to the Master Machine 210. Similarly, a container 2402 including one virtual machine 2322 can be created on Worker Machine 2302 to run the Medical Applications 220. As another example shown in FIG. 2, the $3^{rd}$ party applications 226 can be divided up between the virtual machines 231n and 232n of distributed container 240n on Worker Machine 230n.

To summarize, FIG. 2 shows how the disclosed system would support running arbitrary ML algorithms in the distributed data center. MLEngine (as shown in FIG. 1) employs a container technology to run any containerized distributed ML app, providing support for running third-party application, and enables a simple distribution of applications and easy deployment. It should be understood that the type of programs that can run in the systems of FIGS. 1 and 2 is not limited to ML programs.

Figure 3A:
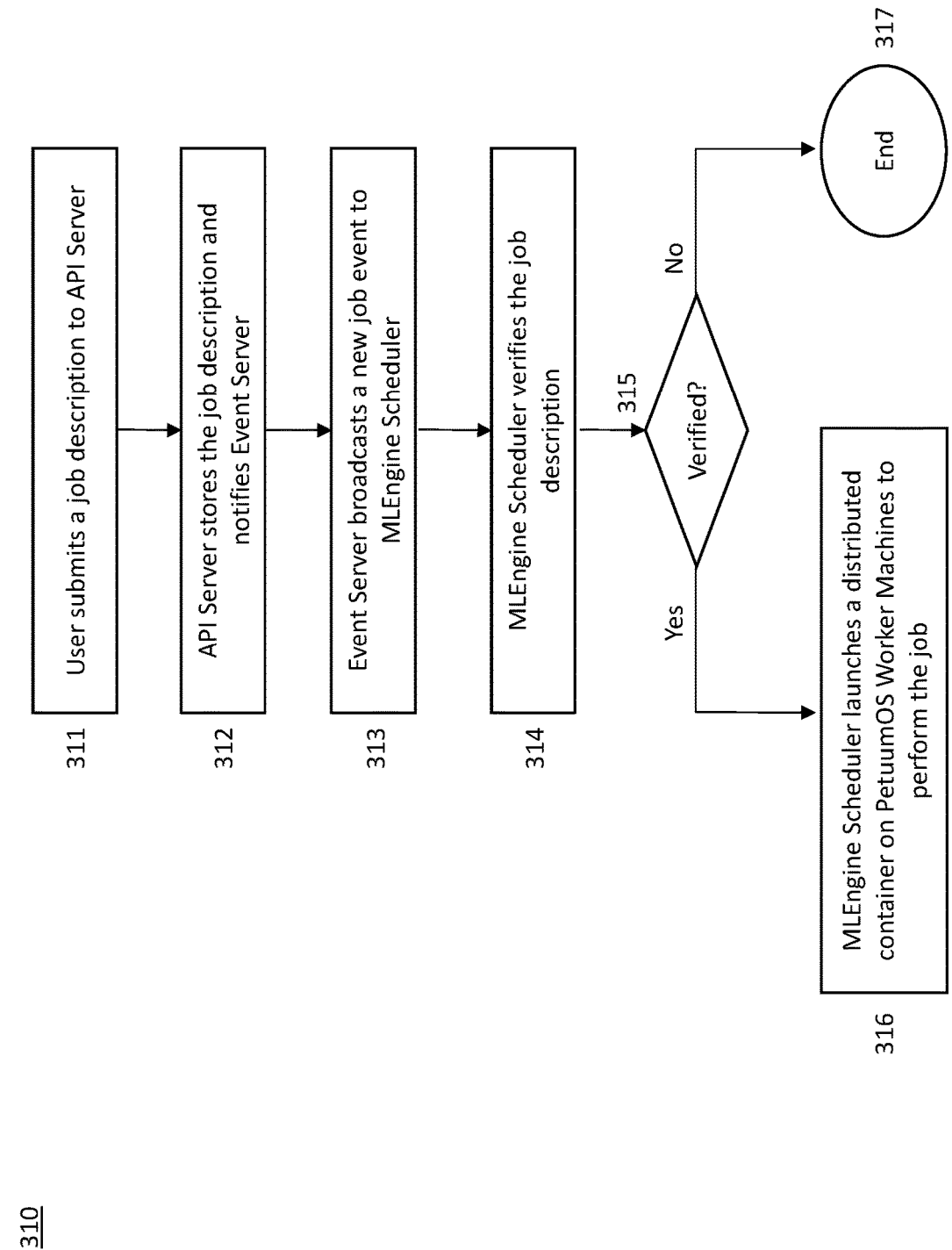

FIG. 3a illustrates the exemplary steps in processing a user request through the distributed systems of FIGS. 1 and 2. First, a user request or job description is submitted by a user or a client to the API Server on the Master Machine of the distributed system (step 311). The API Server can store the job description and notify the Event Server on the Master Machine (step 312). In response, the Event Server broadcasts the newly-received job description to the MLEngine Scheduler (step 313). The MLEngine Scheduler verifies the job description to ensure that it is one that can be performed by the distributed system (steps 314 and 315). If verified, the MLEngine Scheduler can create and launch a distributed container on one or more of the Worker Machines to perform the job according to the job description (step 316). The distributed container may include one or more virtual machines running on one or more Worker Machines. Each virtual machine can perform part of the job and report the result back to the Master Machine. If the MLEngine cannot verify the job description (step 315), the process will terminate (step 317).

Figure 3B:
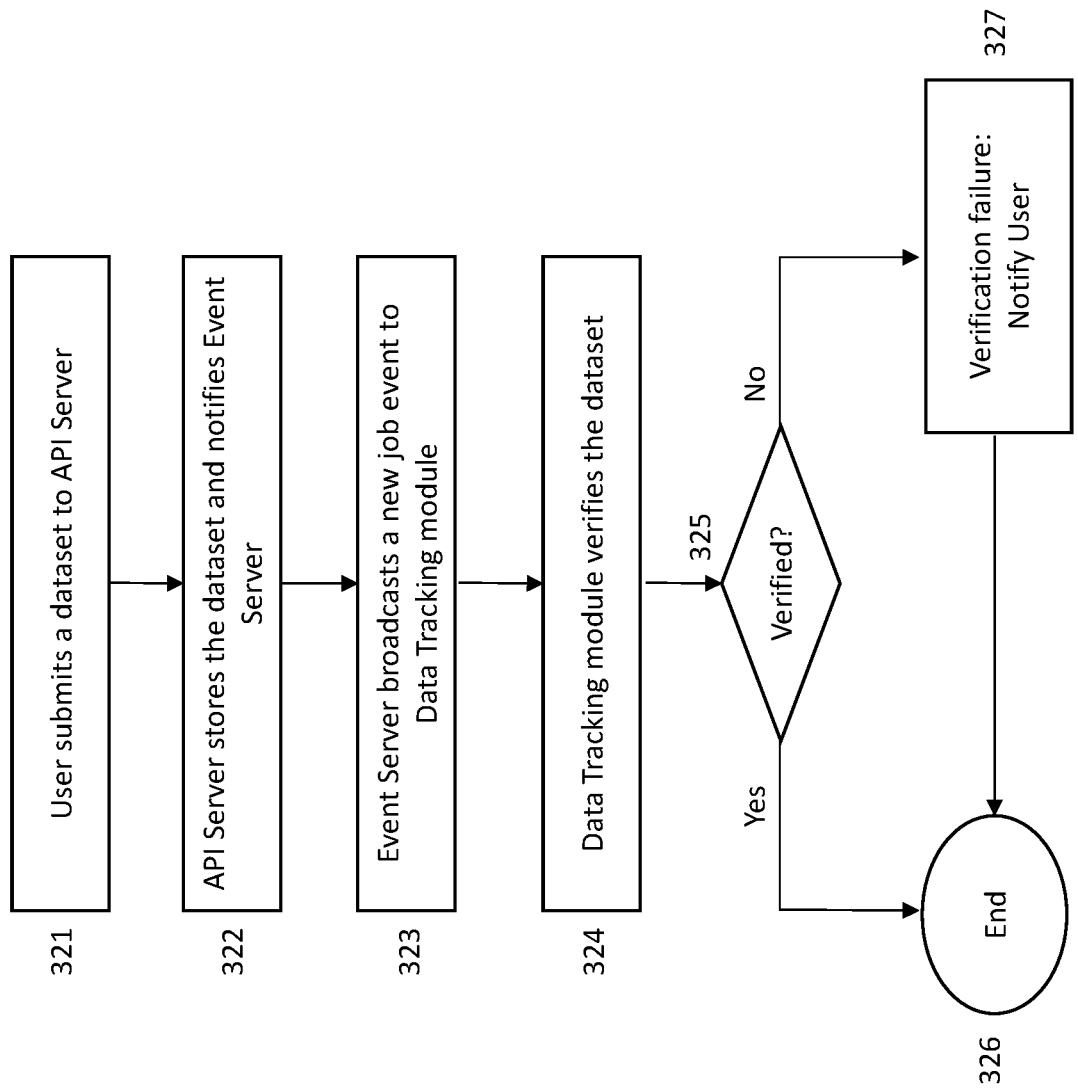

FIG. 3b illustrates the exemplary steps in the process of verifying a dataset submitted to the distributed system of FIGS. 1 and 2. First, a dataset is received from a user or a client by the API Server on the Master Machine (step 321). The API stores the dataset in the Database module and notifies the Event Server (step 322). The Event Server broadcasts a new event to the Data Tracking module (step 323). The Data Tracking module then verifies the dataset (steps 324 and 325). Once verified, the data is ready for use when called upon by a program (step 326). If verification is unsuccessful, the user/client can be notified (step 327).

FIG. 3c illustrates the exemplary steps in the process of verifying the location of a dataset stored on the distributed system. First the location of a remote dataset is submitted by a user/client to the API Server of the Master Machine (step 331). The API Server can store the location of the dataset in its Database module and notify the Event Server (step 332). The Event Server can then broadcast a new job event to the Data Tracking module (step 333). The Data Tracking Module can verify the location of the dataset (steps 334 and 335).

If the location is verified, the process ends (step 336). If the location is not verified, the user/client can be notified about the failed verification (step 337).

Figure 4:
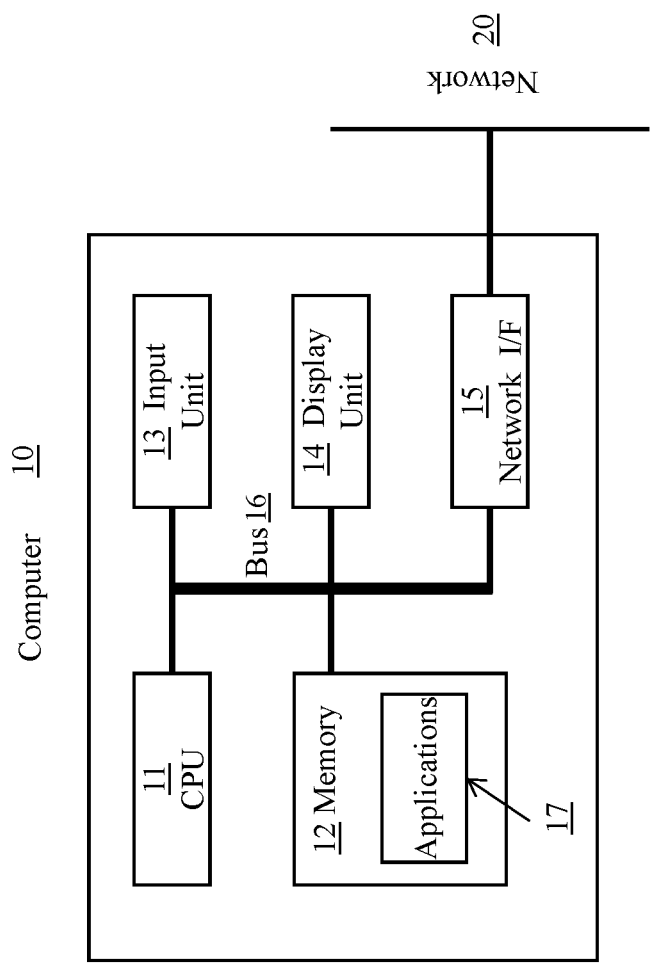
FIG. 4 is a block diagram illustrating an exemplary computer in which embodiments of the invention can be implemented.

FIG. 4 illustrates the exemplary components of a computer 10 which can be the Master Machine or any of the Worker Machines in FIGS. 1 and 2. The computer 10 can include a central processing unit (CPU) 11, memory 12 storing one or more applications 17, an input unit 13, a display unit 14, and a network interface 15, all connected to a bus 16. The network interface 15 allows the computer to connect to a network 20. In a Master Machine such as the one shown in FIG. 1, the one or more illustrated modules can be stored in memory 12. The input unit 13 can receive job descriptions or user requests from a user/client. The network interface 15 allows the Master Machine to communicate with one or more of the Worker Machines. Such communication may include launching distributed containers on the Worker Machines, delivering programs and/or dataset to the Worker Machines, and receiving resulting from the Worker Machines.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A system comprising a master machine and a plurality of worker machines, the master machine comprising:
   an API server configured to receive a job description;
   an application cluster comprising one or more application programs executable on a plurality of virtual machines on the worker machines, wherein the one or more application programs comprising one or more Poseidon application programs, one or more medical application programs, and one or more $3^{rd}$ party application programs;
   a resource allocation module configured to determine a number of the virtual machines required to perform a job based on the job description, wherein the job description corresponds to at least one of uploading the application programs, uploading a dataset, and running the application programs on the worker machines;
   a container scheduling module configured to create a distributed container containing the number of virtual machines required to perform the job, wherein the distributed container is created by the container scheduling module to run the Poseidon application programs, wherein the distributed container is created on the worker machines to run the medical application programs, wherein the $3^{rd}$ party application programs are divided between the virtual machines of the distributed container on the worker machines;
   wherein at least two of the virtual machines in the container resides on different worker machines, and
   wherein each of the virtual machines is configured to run the same application programs to perform the job;
   a database module configured to store the job descriptions and one or more datasets, wherein the API server stores a location of the datasets in the database module; and
   a data tracking module configured to verify the location of the one or more datasets and track the location of the one or more datasets stored in the database module.

2. The system of claim 1, wherein the master machine further comprises an event server configured to broadcast the job description to the container scheduling module and the resource allocation module.

3. The system of claim 1, wherein the master machine further comprises a web server configured to receive a job description from a web interface.

4. The system of claim 1, wherein each of the worker machines comprises an MLEngine configured for running a machine learning program.

5. The system of claim 1, wherein the master machine further comprises an authentication module configured for authenticating users.

6. The system of claim 1, wherein at least one of the work machines hosts at least two virtual machines belonging to different containers.

7. The system of claim 1, wherein each of the worker machines comprises an MLEngine configured to carry out computation and training of machine learning models.

8. The system of claim 1, wherein the master machine further comprises a MLEngine Scheduler configured to verify the job description.

9. A method of running an application comprising:
   receiving, by an API server, a job description from a client;
   storing the job description in a database;
   executing one or more application programs on a plurality of virtual machines on a plurality of worker machines, wherein the one or more application programs comprising one or more Poseidon application programs, one or more medical application programs, and one or more $3^{rd}$ party application programs;
   determining a number of the virtual machines needed to perform a job based on the job description, wherein the job description corresponds to at least one of uploading the application programs, uploading a dataset, and running the application programs on the worker machines;
   creating, by a container scheduling module, a distributed container containing the number of virtual machines across a plurality of physical machines, wherein the distributed container is created by the container scheduling module to run the Poseidon application programs, wherein the distributed container is created on the worker machines to run the medical application programs, wherein the $3^{rd}$ party application programs are divided between the virtual machines of the distributed container on the worker machines;
   enabling instances of an application on each of the virtual machines to perform the job;
   verifying, by a data tracking module, location of one or more datasets; and
   tracking, by the data tracking module, location of the one or more datasets.

10. The method of claim 9, wherein the job description is received at a master machine in communication with the plurality of worker machines.

11. The method of claim 10, wherein at least two of the virtual machines in the distributed container resides on different worker machines.

12. The method of claim 10, each of the worker machines comprises an MLEngine configured for running a machine learning program.

13. A non-transitory computer-readable medium comprising instructions which, when executed by a processor, initiate a process comprising:
   receiving, by an API server, a job description from a client;
   storing the job description in a database;
   executing one or more application programs on a plurality of virtual machines on a plurality of worker machines, wherein the one or more application programs comprising one or more Poseidon application programs, one or more medical application programs, and one or more $3^{rd}$ party application programs;
   determining a number of the virtual machines needed to perform a job based on the job description, wherein the job description corresponds to at least one of uploading the application programs, uploading a dataset, and running the application programs on the worker machines;
   creating, by a container scheduling module, a distributed container containing the number of virtual machines across a plurality of physical machines, wherein the distributed container is created by the container scheduling module to run the Poseidon application programs, wherein the distributed container is created on the worker machines to run the medical application programs, wherein the $3^{rd}$ party application programs are divided between the virtual machines of the distributed container on the worker machines;
   enabling instances of an application on each of the virtual machines to perform the job;
   verifying, by a data tracking module, location of one or more datasets; and
   tracking, by the data tracking module, location of the one or more datasets.

14. The non-transitory computer-readable medium of claim 13, wherein the job description is received at a master machine in communication with the plurality of worker machines.

15. The non-transitory computer-readable medium of claim 14, wherein at least two of the virtual machines in the distributed container resides on different worker machines.

16. The non-transitory computer-readable medium of claim 14, wherein each of the worker machines comprises an MLEngine configured for running a machine learning program.

* * * * *